UNITED STATES PATENT OFFICE.

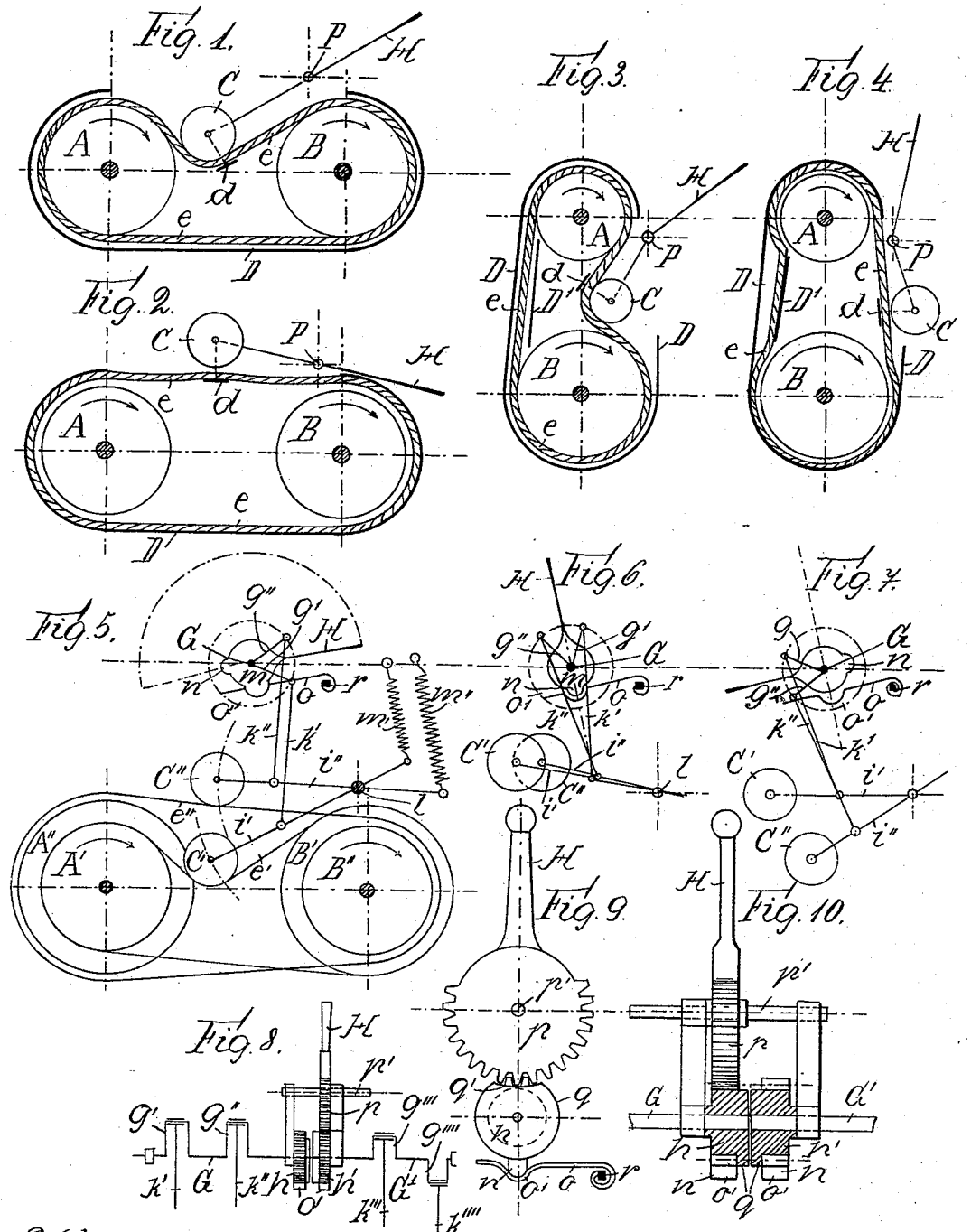

WILHELM MAYBACH, OF CANNSTADT, GERMANY.

ENGAGING OR DISENGAGING GEAR FOR MACHINE-BELTS.

SPECIFICATION forming part of Letters Patent No. 492,872, dated March 7, 1893.

Application filed September 12, 1892. Serial No. 445,676. (No model.)

*To all whom it may concern:*

Be it known that I, WILHELM MAYBACH, a subject of the King of Würtemberg, and a resident of Cannstadt, in the Kingdom of Würtemberg, Empire of Germany, have invented certain new and useful Improvements in Engaging and Disengaging Gear for Machine Belts or Ropes, of which the following is a full, clear, and exact specification.

My invention relates to an engaging and disengaging gear for machine belts or ropes, by means of which the belt or rope, when thrown out of gear, is removed entirely or almost entirely out of contact with the pulleys.

My invention also consists, further, of means permitting only one of several change belts or ropes to be thrown into gear at a time.

My invention will be more readily understood by reference to the accompanying drawings, in which:

Figure 1 is an elevation showing two pulleys and a horizontal belt connecting the same, and the means for holding the belt out of contact with the pulleys. Fig. 2 shows the position of the parts when out of gear. Figs. 3 and 4 are views corresponding to Figs. 1 and 2 of another form of construction, in which a vertical belt is employed. Fig. 5 is an elevation showing my improved engaging and disengaging gears for change belts or ropes. Figs. 6 and 7 are diagrams illustrating two additional positions of the main parts of the gear shown in Fig. 5. Fig. 8 is a front elevation representing a modification of this gear, as employed for four change belts. Fig. 9 is a detail side elevation showing the coupling-handle of this gear and the parts directly connected to the same. Fig. 10 is a detail sectional elevation of the same parts.

Similar letters denote similar parts throughout the several views.

In Figs. 1 and 2 A is the driving and B the driven pulley, C a tension-roller adapted to be swung around the pivot P by means of the handle H; e is the belt; D a solid or at least stiff casing or frame parallel to the belt when the same is driving the pulley B, and, d, a rest suspended from the axle of the roller C.

In order to throw the pulley, B, and the belt, e, into gear, the right end of handle H is raised, and the roller C pressed on the belt e, as shown in Fig. 1. When desired to disengage the belt, the right end of handle H is depressed, and the tension-roller C raised, so as to lift simultaneously the portion of the belt, e, next to the rest d. The lower half of the belt, in consequence of its weight, will sink and rest on the casing D, and the side portions will also entirely, or for a great part, lay themselves against the said casing, in consequence of their natural stiffness (see Fig. 2.) The belt e will thus be entirely out of contact with the pulleys A and B, and the friction and attendant wear will be considerably reduced or altogether avoided.

In Figs. 3 and 4 I have shown another form of construction in which the pulleys are located one above the other. The construction in itself is distinguished from that before described merely by the addition of a stationary rest D' between the pulleys A and B and opposite the displaceable rest d. The operation of this mechanism is as follows: Throwing the parts into gear is accomplished as before described. In order to disengage the belt e, the upper end of the handle H is turned to the left so as to discontinue the pressure exerted on the belt by the tension-roller C. The lower portion of the belt e will slip off the pulley B and lay itself on the lower circular portion of the casing D, owing to its own weight. The middle portion of the belt will rest on the rests D' and d respectively. The upper portion, owing to the stiffness of the belt, will bend slightly outward so as to come in contact with the upper circular end of the casing D. The effect of this arrangement is exactly the same as before described, namely to reduce or to remove entirely the friction between the belt and the pulleys. It will be obvious that these two forms of construction may be employed for belts and ropes inclined at any angle.

I will now describe the means which I employ for engaging and disengaging several change belts or ropes in such a manner, that only one of them can be engaged at a time. In Figs. 5 to 7 I have shown the construction of this means as employed for two change belts, and Figs. 8 to 10 illustrate a modification in which four change-belts are used.

Referring to Figs. 5 to 7, A' A'' are the driving and B' B'' the corresponding driven pulleys; e' e'' are the driving belts, and C' C'' the corresponding tension-rollers. These rollers are pivoted at the ends of levers $i'$ and $i''$ respectively, both loosely and independently mounted on an oscillatory shaft $l$. The rear ends of the double-armed levers $i'$ $i''$ are constantly drawn upward by means of springs $m'$ and $m''$ respectively. The levers $i'$ and $i''$ are linked to cranks $g'$ and $g''$ respectively by means of connecting-rods $k'$ and $k''$ the ends of which are joined to the levers between the shaft $l$ and the tension-rollers. The cranks $g'$ and $g''$ are mounted on a shaft G and form with each other an angle of about sixty degrees. H is a handle by means of which shaft G may be turned, and is formed with a disk $m$ having a cam $n$, adapted to snap into a recess, $o'$, of the spring $o$ secured at $r$. The operation of this mechanism is as follows: When the handle H is in the extreme right position (Fig. 5), the roller C' is depressed and the roller C'' raised, that is to say, the belt $e'$ is engaged with the pulleys A' and B', and the belt $e''$ disengaged from the pulleys A'' and B''. When throwing the handle H over to the left into the central position illustrated by Fig. 6, both the rollers C' and C'' will be raised and both the belts $e'$ and $e''$ disengaged. The handle H is locked in this position by the cam $n$ snapping into the recess $o'$ of the spring $o$. When throwing the handle H full over to the left, the roller C' will be raised and the belt $e'$ disengaged, whereas the roller C'' will be depressed and thrown into gear, as shown in Fig. 7. The action of the springs $m'$ and $m''$ presents the peculiarity that when one of the rollers C' or C'' is depressed both springs keep the same on the belt; for instance when the roller C' is depressed (Fig. 5), the spring $m'$ presses the same downward directly, the spring $m''$ tends to depress the roller C'' and to draw the crank $g''$ downward by means of the connecting-rod $k''$. The shaft G will thus be subjected to a torsional strain, and the crank $g'$, being secured to the shaft, will be depressed, exerting a downward pressure on the lever $i'$ and the roller C'. The same effect will occur when the roller C' is raised, and the roller C'' depressed, as will be understood with reference to Fig. 7. When the handle H is in the middle position (Fig. 6), the cranks $g'$ and $g''$ are situated symmetrically to the handle, so that the springs $m'$ and $m''$ will each tend to turn the handle in another direction with the same force; the spring $o$, therefore, will easily be able to hold the handle in this position.

It will be obvious that the two springs $m'$ and $m''$ may be replaced by a single spring secured to the disk $m$ at a point between the cranks $g'$ $g''$ or between their extensions, on the opposite side of the disk $m$. It will be further obvious that the connecting-rods $k'$ $k''$ may be joined to the levers $i'$ $i''$ at the ends, where the springs $m'$ $m''$ are fastened in the construction illustrated by the drawings; in this case the springs $m'$ $m''$ would be secured to those arms of the levers $i'$ $i''$, on which the tension-rollers C' C'' are provided. I may also secure the springs $m'$ $m''$ on the same side of the shaft $l$ on which the tension-roller C' C'' are located, the springs being constructed in such a manner as to exert a downward pressure on the levers $i'$ and $i''$.

In Figs. 8 to 10 I have illustrated the construction of my improved gear as employed for operating four change-belts. The pulleys, belts, tension-rollers, the levers to which the latter are secured, and the springs depressing said levers are not shown in these figures, being arranged substantially as illustrated by Fig. 5 and described with reference thereto. The connecting-rods $k'$ $k''$ $k'''$ $k''''$ are joined to the cranks $g'$ $g''$ $g'''$ $g''''$ on the cranked shafts G G'. The cranks $g'$ and $g''$ form with each other an angle of about sixty degrees (as in Fig. 5), and the relative position of the cranks $g'''$ and $g''''$ is a similar one. The inner ends of the shafts G G', which almost touch one another (see Fig. 10), are provided with toothed wheels $h$ $h'$. Each of these wheels is provided with a circular flange $q$ projecting beyond the face of the teeth, except on a short portion of the periphery, where it is cut off, as shown at $q'$, Fig. 9. Opposite this notch $q'$ a cam $n$ is secured to each of the toothed wheels $h$ and $h'$, this cam being adapted to snap into a recess $o'$ of the spring $o$, as already described. The handle H is located above the toothed wheels $h$ and $h'$, and provided with a toothed disk $p$ which may be brought into gear with either of the said toothed wheels by shifting it laterally; to this end, the disk $p$ is loosely mounted on its shaft $p'$, or the shaft itself may be shifted together with the disk. This mechanism is operated as follows: In order to engage one of the belts operated by the cranks $g'''$ and $g''''$, while either of the other two belts is engaged, the handle H, which in this case is placed directly above the toothed wheel $h$, is raised to the vertical position, Figs. 9 and 10. The cranks $g'$ and $g''$ are thereby brought into the elevated position shown in Figs. 8 and 6, and the corresponding belts disengaged from the pulleys. The cam $n$ of the toothed wheel $h$ will snap into the recess $o'$ of the spring $o$, and the cranks $g'$ and $g''$ will be locked in their position. The notch $q'$ will assume the only position in which it permits of the disk $p$ being shifted sidewise, so that the latter may be brought to engage with the toothed wheel $h'$; the notch $q'$ of this wheel is of course in the same position as that of the toothed wheel $h'$, as both the cranks $g'''$ and $g''''$ are elevated, and the corresponding belts disengaged. It will be obvious that by turning the handle H downward to the right or to the left either of the belts operated by the cranks $g'''$ or $g''''$ may be thrown into gear with the corresponding pulleys. It will be further obvious that only one of the four belts can be engaged at a time. This mechanism for operating four change-belts is obtained merely by a duplication of the mechanism shown in Figs. 5—7 and by making the handle H displaceable laterally.

Instead of providing the flanges $q$ on the wheels $h\ h'$, I may form the disk $p$ with a circular flange having an appropriate notch.

I wish it to be understood that the devices illustrated by Figs. 1 to 4 may be applied to the mechanisms represented in Figs. 5 to 10, and I prefer to employ these devices in any case where belts or ropes are brought to engage with their pulleys by means of tension-rollers.

What I claim, and desire to secure by Letters Patent of the United States, is—

1. The combination, with a driving and a driven pulley, a belt placed on the same, and a pivoted roller adapted to throw the belt and pulleys into gear, of a rest connected to the roller and adapted to remove the belt from the pulleys, and a casing adapted to support the greater portion of the belt, when the same is disengaged, for the purpose set forth.

2. The combination, with the driving pulley A, the driven pulley B, the belt $e$, and the tension-roller C pivoted by means of the handle H, of the rest $d$, adapted to be displaced together with the roller C, and the casing D, substantially as and for the purpose described.

3. The combination, with the driving-pulley A, the driven pulley B, the belt $e$, and the tension-roller C pivoted by means of the handle H, of the rest $d$, adapted to be displaced together with the roller C, the casing D and the stationary rest D', substantially as and for the purpose described.

4. In an engaging and disengaging gear for change-belts or ropes, the combination, with the driving pulleys A' A'', the driven pulleys B' B'', the belts $e'\ e''$, the levers $i'\ i''$, and tension-rollers C' C'', of springs tending to press the rollers on the belts, connecting-rods $k'\ k''$, the cranks $g'$ and $g''$, forming an angle with each other, the shaft G, handle H, and means for locking the same in its middle position, for the purpose set forth.

5. In an engaging and disengaging gear for change-belts or ropes, the combination, with the driving pulleys A' A'', the driven pulleys B' B'', the belts $e'\ e''$, the levers $i'\ i''$, and tension-rollers C' C'', of the springs $m'\ m''$, connecting-rods $k'\ k''$, the cranks $g'$ and $g''$, forming an angle with each other, the shaft G, handle H, the disk $m$ having cam $n$, and the spring $o$ having recess $o'$, substantially as and for the purpose described.

In testimony whereof I have signed this specification in the presence of two subscribing witnesses.

WILHELM MAYBACH.

Witnesses:
ERNST NOCIOCS,
CARL LINCK.